Patented Feb. 24, 1953

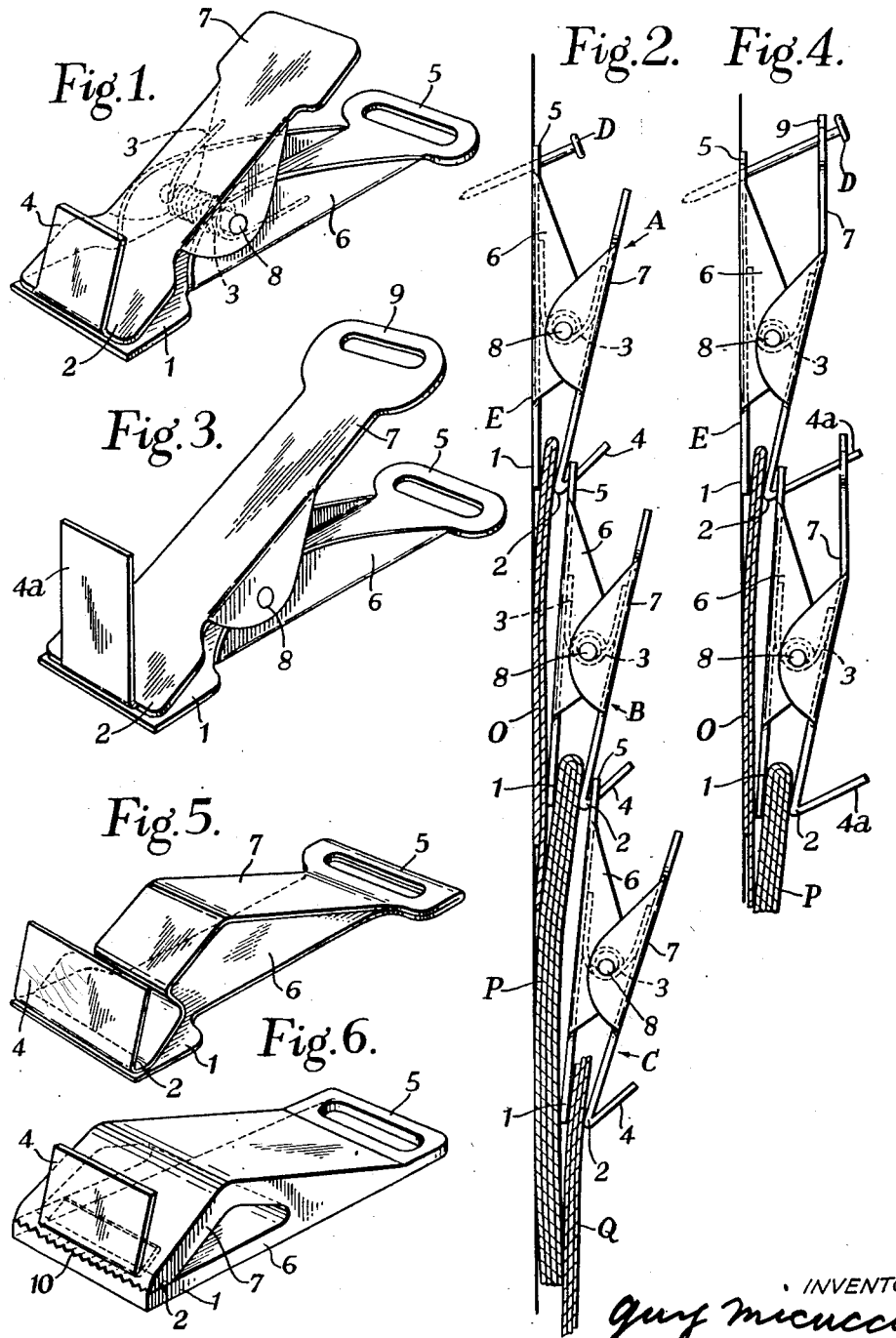

2,629,154

UNITED STATES PATENT OFFICE 2,629,154

SUSPENSION CLIP DEVICE

Guy Micucci, Geneva, Switzerland, assignor to Henry Roat, London, England

Application May 11, 1951, Serial No. 225,698
In Switzerland May 13, 1950

2 Claims. (Cl. 24—84)

The present invention relates to suspension clip devices for holding objects such as, for example, patterns, designs or previously cut-out pieces of material used in the making up of garments, which need to be suspended so as to be accessible for individual selection and readily taken for use as required.

Hitherto, when it has been desired to arrange certain articles, for example the patterns or the like used in a sewing workroom, in suspended orderly array, the patterns have sometimes been hung from a ring and sometimes threaded upon strings, the ring or strings being secured to a supporting member above the floor level, but both of these suspension systems possess disadvantages. In the first case for instance, when a user needs to select and detach one of the patterns from a collection held in suspension on the ring it is necessary to pull the pattern downwards and thus tear the upper part thereof away from the ring. In the second case, it is necessary for the user to untie the string before removing the selected pattern from the collection and then to retie the string, which is a tiresome procedure and wastes time.

The primary object of the present invention is to provide a modified and improved suspension clip device which can be used for the purpose above set forth and avoids the inconvenience and disadvantages of the means hitherto used for the purpose.

According to the present invention provision is made of a suspension clip device comprising at least two relatively movable parts forming jaws which are adapted to grip an object or objects placed therebetween, and suspension hook coupling means disposed at different points of the device to enable the device to be coupled in a readily detachable manner to two other similar devices at the same time, so that two or more of the devices can be coupled together in a chain and suspended from another of the devices or from a different supporting member as desired.

The suspension clip devices of this invention may each be provided with means for yieldingly urging the jaws together and coupling means in the form of a suspension hook and a corresponding slotted shackle disposed in spaced relation so that the hook of one device may conveniently be engaged in the shackle slot of another device in order to couple the said devices together.

Constructional forms of suspension clip devices embodying the invention will hereinafter be described by way of example and with reference to the accompanying drawings in which:

Fig. 1 is a line perspective view of one form of the suspension clip device;

Fig. 2 shows, in side elevation, a group of three such devices suspended in a chain from a supporting member fixed in a wall or partition;

Fig. 3 is a line perspective view of an alternative form of the suspension clip device;

Fig. 4 shows, in side elevation, a pair of the devices of Fig. 3 coupled together and suspended from a supporting member fixed to a wall or partition;

Figs. 5 and 6 are line perspective views of other alternative forms of the suspension clip device.

In the form shown in Figs. 1 and 2 of the drawings, the suspension clip device comprises a pair of relatively movable jaws 1, 2 formed at the ends of clip parts 6, 7 which are articulated i. e. hingedly connected together by a transverse pivot pin 8. The jaws 1, 2 are yieldingly urged together in gripping relation by a twist spring 3 which surrounds the pivot pin 8 and re-acts between the parts 6 and 7.

The part 6 of the suspension clip constitutes a holder and, to this end, is provided at its upper end with a slotted shackle 5 which serves for suspending the device from a suitable supporting member or another clip.

The part 7 carries a hook 4 disposed at the outer extremity of the jaw 2 and projecting upwards and outwards at an inclination thereto.

The hook 4 and slotted shackle 5 form the coupling means of each suspension clip device and the parts of a size which permits the hook 4 of any one of the devices easily to engage in the shackle slot of any other one of the devices.

The manner in which the suspension clip device shown in Fig. 1 is used will clearly be seen from Fig. 2 in which three such devices A, B and C are shown coupled together through the medium of their hooks 4 and slotted shackles 5. The topmost device A is hung from a nail D fixed in a wall or other upright E and thus the nail D forms a supporting member from which the chain of suspension clip devices A, B and C carrying objects O, P and Q are suspended.

In order to guard against the parting of the jaws of the suspension clip devices by the drag of the other device or devices suspended therefrom, the hook 4 of each device may be suitably elongated as shown, and arranged to project so that the perpendicular passing through the point of suspension of the device B from the hook 4 of device A, for example, passes to the right of the pivotal axis 8 of the device A (as viewed in Fig. 2). Thus, all of the dragging effect exercised upon the part 7 of the device A will tend to increase the grip of the jaws 1, 2 thereof upon the objects O.

Similarly, by suitably determining the relative angular settings of the hooks 4 and slotted shackles 5, the gripping or clamping effect upon the jaws 1, 2 can be increased by the drag applied to each device by the other device or devices suspended therefrom. Furthermore, it can be ensured, in the manner last described, that each device supported from the hook of an upper device is held clear of the objects gripped in and suspended from the jaws of the upper supporting device. This separation of the suspension clip device and objects depending from another device is a great advantage when a chain of the devices are used for suspending objects such as photographs, films, ink prints and like wet surfaced objects requiring a certain time for drying.

It will be appreciated that the suspension clip device may have a form more or less different from that shown in Fig. 1. Thus, as shown in Figs. 3 and 4, the upper end of the articulated part 7 of the device may also be elongated and formed with a slotted shackle 9 disposed in relation to the slotted shackle 5 of the holder part 6 so that both shackles are adapted to engage the supporting nail D or suspension hook of another device as shown in Fig. 4. In this form of the device the suspension hook 4a is also elongated and set at a different angle to that shown in Fig. 1, in order conveniently to engage both slotted shackles 5 and 9.

Alternatively, when the part 7 of the device is provided with the slotted shackle 9, the slotted shackle 5 may be omitted from the end of the holder part 6.

Instead of comprising two articulated parts as described above, the suspension clip device of this invention may be made in one piece, for example by suitably bending and folding a strip of spring blade to a substantially U-shape form, as shown in Fig. 5. Like references applied to this figure indicate the parts of the device corresponding to the parts of the device described above with reference to Fig. 1. It will be seen that the fold end of the spring strip is slotted to form the shackle 5; the flexible limbs of the folded strip comprise relatively hinged parts 6 and 7, while the free ends of the strip are brought together and angularly disposed to form the relatively movable jaws 1, 2 and the free end of limb 7 outwardly offset to provide the hook 4.

In another variation, as shown in Fig. 6, the suspension clip device may be formed from a block of elastic material e. g. rubber or a rubber-like substance moulded or otherwise shaped to exhibit a slotted shackle 5 at the one end and having its further end bifurcated to provide jaws 1, 2 which are relatively movable and urged together into gripping relation by reason of the inherent resilience of the material from which the device is made. A suspension hook 4, e. g. made of metal, is set in the outer extremity of the jaw 2 of the device.

In any of the various constructional forms of the invention described above, either or both of the jaws 1, 2 may carry corrugations, teeth or other means allowing a better grip to be obtained by the jaws upon the objects clamped therebetween. By way of example, the jaws 1, 2 of the form of the invention shown in Fig. 6 are provided with intermeshing corrugations 10.

The device of this invention is particularly advantageous for the purpose above set forth, but may also be used for many other purposes, for example for supporting in suspension such articles as newspapers, tapestries, fabrics and the like.

I claim:

1. A clip comprising a base having a gripping jaw at one end and a suspension means at the other end, an opposed jaw having a resilient connection to said base and a gripping jaw at one end opposite and cooperating with the base gripping jaw to hold articles therebetween, a flange projecting outwardly acutely below the connection from the face of the opposed jaw adjacent its end and opposite its gripping jaw, and also opposite said base gripping jaw, the distance between the flange and the said connection being less than or equal to the distance between the connection and the base jaw, the attachment of the flange to the jaw being rigid, comparatively to the resiliency of the connection of the opposed jaw to the base, said flange serving as a hook for hanging other similar clips thereon, whereby a pull upon the flange will close the jaws tighter when the clip is hung by the suspension means and the base of the clip is supported against bodily rotation prior to placing tension on the flange.

2. A clip comprising a pair of arms facing one another and resiliently, hingedly connected together intermediate their ends, and having opposed gripping jaws at one end, one arm comprising the clip base and having thereon a suspension means at the end opposite the jaws, a flange projecting outwardly acutely below the hinged connection, from the other arm and opposite the jaws, the connection of the flange to the arm being rigid, the flange serving as a hook for hanging thereon other similar clips, the distance between the flange and hinged connection being less than or equal to the distance between the hinged connection and the jaw on the base arm, whereby a pull upon the flange will close the jaws tighter when the clip is hung by the suspension means and the base arm of the clip is supported against bodily rotation prior to placing tension on the flange.

GUY MICUCCI.

REFERENCES CITED

The following references are of record in the file of this patent:

UNITED STATES PATENTS

| Number | Name | Date |
|---|---|---|
| 251,853 | Ewing | Jan. 3, 1882 |
| 299,725 | Bray | June 3, 1884 |
| 485,229 | Reed | Nov. 1, 1892 |
| 961,626 | Maitland | June 14, 1910 |
| 1,321,735 | Graves | Nov. 11, 1919 |
| 1,491,286 | Calhoun | Apr. 22, 1924 |
| 2,159,572 | Starr | May 23, 1939 |